Aug. 20, 1968 R. V. JONES ETAL 3,398,383

MICROWAVE MODULATOR USING ANISOTROPIC EFFECTS OF FERROMAGNETIC RESONANCE IN SINGLE CRYSTALS

Filed July 28, 1965

INVENTORS.
RICHARD V. JONES and
ALAN B. SMITH
BY Harry A. Herbert Jr. and
Sherman H. Goldman
ATTORNEYS United States Patent Office 3,398,383

Patented Aug. 20, 1968

3,398,383

MICROWAVE MODULATOR USING ANISOTROPIC EFFECTS OF FERROMAGNETIC RESONANCE IN SINGLE CRYSTALS

Richard V. Jones, Arlington, and Alan B. Smith, Belmont, Mass., assignors to the United States of America as represented by the Secretary of the Air Force Filed July 28, 1965, Ser. No. 475,616
3 Claims. (Cl. 332—29)

ABSTRACT OF THE DISCLOSURE

Two piezoelectric crystals attached back-to-back with reversed senses of polarization placed in a microwave cavity. A twisting motion is produced when an electric field is applied to the composite device, causing a change in the angle that the anisotropy field makes with the crystalline axis which will accordingly shift the ferromagnetic resonance.

This invention relates generally to a microwave modulator, and more specifically to a microwave modulator which uses anisotropic effects of ferromagnetic resonance in single crystals to provide modulation.

It is well known that a ferrite body exposed to an alternating magnetic field at a frequency $\nu$ becomes highly absorptive and dispersive in a region near ferromagnetic resonance (hereinafter called FMR). For example, in the case of a spherically shaped body, FMR is achieved by applying a D.C. magnetic field $H=\nu/k$ ($k$ is approximately 2.80 mc./s./gauss for most materials) at right angles to the alternating field. This effect has been used extensively in microwave technology to obtain selective loss characteristics and phase shifts. A number of types of microwave modulators have been obtained by applying modulation signals to the biasing D.C. magnetic field and thus shifting conditions for FMR.

Although such devices are useful, they are usually limited to low frequencies of modulation due to the difficulties of driving the inductive windings of the modulation coils at high frequencies. Also, these devices are usually quite bulky and consume large amounts of electrical power.

The microwave modulator of this invention is one of a class which simultaneously utilizes the properties of piezoelectricity and ferromagnetism. The modulator takes advantage of the orientation dependent properties of a gyromagnetic media. The particular advantage of this device over other types of modulators lies in the fast time response of piezoelectric elements driven as a capacitance. Capacitive drive has the particular advantages of negligible power consumption, reduced bulk, and high modulation rates.

An immediate practical application of this invention is seen in the artificial earth satellite, where weight and power consumption are of critical importance and modulation of microwave transmission is sometimes extremely important.

It is, therefore, an object of this invention to provide a new and more efficient method and apparatus for the modulation of microwaves.

It is a further object of this invention to provide an apparatus for modulating microwaves which is of reduced bulk from any hitherto known.

It is another object of this invention to provide a microwave modulator which has negligible power consumption.

It is still another object of this invention to provide a microwave apparatus with higher modulation rates than any similar device hitherto known.

It is still a further object of this invention to provide a microwave modulator which operates at resonant frequency.

It is another object of this invention to provide a microwave modulator which causes a shift in resonant frequency.

It is still another object of this invention to provide an apparatus which modulates waves of radio frequency with piezoelectric elements driven as a capacitance.

It is another object of this invention to provide a device which will tune a resonance field value by changing the anisotropic effects of ferromagnetic resonance in single crystals.

It is still a further object of this invention to modulate high frequency waves by twisting a ferromagnet in a D.C. magnetic field and shifting the resonant frequency.

These and other advantages, features and objects of the invention will become more apparent from the following description taken in connection with the illustrative embodiments in the accompanying drawings, wherein.

Anistrophy is generally defined as the dependence of a physical property on the angle between an applied constraint and some fixed direction. Anisotrophy of the microwave magnetic properties of ferrites is, then, represented by the dependence of the components of the magnetic susceptibility tensor on the orientation of the coordinate axis with respect to some special directions in a sample, and magnetocrystalline anisotrophy is the dependence of magnetic properties of a ferromagnetic on the direction of its magnetization with respect to the crystal lattice axes.

It is known, therefore, that the effective anisotropy field will depend upon the angle the field makes with the crystalline axis; hence, the resonance condition will depend upon crystal orientation, and accordingly the ferromagnetic resonance may be shifted by changing this angle.

Figure 1:
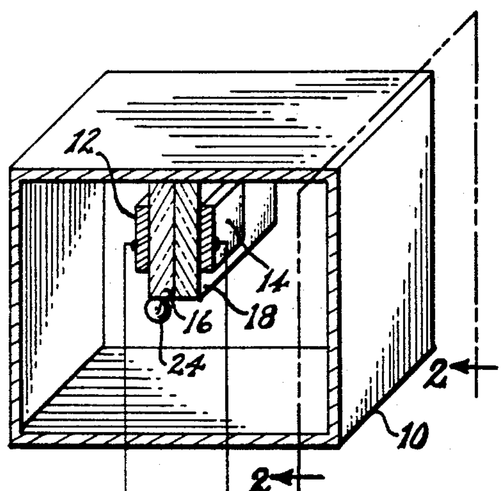
FIG. 1 is an isometric view, partially sectioned of a waveguide and the modulator of this invention.
Figure 2:
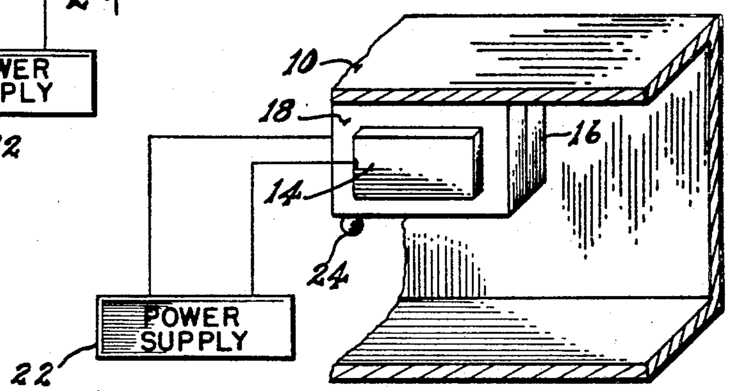
FIG. 2 is similar to that of FIG. 1 with one side of the waveguide removed.

Referring now to FIGS. 1 and 2, there is shown in a wave guide 10, two piezoelectric crystals 16 and 18 which are attached "back-to-back" with reversed senses of polarization. When an electric field is applied, by means of the electrodes 12 and 14, to the composite device, a twisting motion is produced. The current for the field is provided by the power supply 22. The modulator material 24 is fixed to the crystal 16 and as the piezoelectric crystals twist under the influence of the applied field, the modulator material moves on a spiral path thereby changing the orientation of the modulator material and, as a result of anisotropic effects, theer is a shift in FMR.

Figure 3:
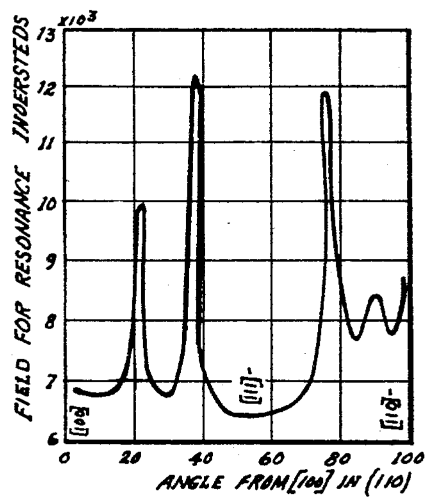
FIG. 3 is a graph illustrating the field of resonance plotted against the angle of rotation.

In certain special cases the field for FMR is a particularly sensitive function of the orientation of the magnetic crystal (modulator material) with respect to the applied magnetic field. For example, as shown in FIG. 3, at very low temperatures (4° K.) a small impurity of terbium in a yttrium iron garnet compound causes the resonance in certain directions to vary at a rate of about 100 oersteds/degree of twist.

We have shown that, by utilizing a piezoelectric transducer as a means of providing a twisting motion for a ferromagnetic material located within a wave guide, it is possible to change the anisotropic effects and cause a shift in ferromagnetic resonance which modulates the high frequency waves with a minimum of microwave loss.

We claim:

1. An apparatus for shifting ferromagnetic resonance in a high frequency wave guide comprising a position changing means including a pair of oppositely polarized piezoelectric crystals securely fastened in back-to-back relation and located within the wave guide, a pair of electrodes in juxtaposition to said crystals, whereby when a current is applied to the electrodes a field is formed which causes the crystals to react with a twisting motion; and a sphere of ferromagnetic material affixed to one of said crystals to shift the ferromagnetic resonance in the wave guide when the said crystals react.

2. A modulator, according to claim 1, wherein said position changing means is a piezoelectric transducer.

3. A modulator, according to claim 2, wherein said ferromagnetic material is the compound yttrium iron garnet.

References Cited

UNITED STATES PATENTS

| | | | |
|---|---|---|---|
| 2,951,214 | 8/1960 | Bomke et al. | 332—52 |
| 3,087,122 | 4/1963 | Rowen | 331—94 |
| 3,235,819 | 2/1966 | Carvelas et al. | 332—51 X |

ALFRED L. BRODY, *Primary Examiner.*